United States Patent
Konno et al.

(10) Patent No.: US 10,731,005 B2
(45) Date of Patent: Aug. 4, 2020

(54) METHOD FOR PRODUCING GRANULAR POLYARYLENE SULFIDE, METHOD FOR INCREASING AVERAGE PARTICLE SIZE OF GRANULAR POLYARYLENE SULFIDE, METHOD FOR ENHANCING PARTICLE STRENGTH OF GRANULAR POLYARYLENE SULFIDE, AND GRANULAR POLYARYLENE SULFIDE

(71) Applicant: Kureha Corporation, Tokyo (JP)

(72) Inventors: Akihiro Konno, Tokyo (JP); Hiroyuki Sato, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 67 days.

(21) Appl. No.: 16/074,915

(22) PCT Filed: Mar. 24, 2017

(86) PCT No.: PCT/JP2017/012012
§ 371 (c)(1),
(2) Date: Aug. 2, 2018

(87) PCT Pub. No.: WO2017/170225
PCT Pub. Date: Oct. 5, 2017

(65) Prior Publication Data
US 2019/0055358 A1    Feb. 21, 2019

(30) Foreign Application Priority Data

Mar. 31, 2016 (JP) .................. 2016-072117

(51) Int. Cl.
| | | |
|---|---|---|
| *C08G 75/04* | (2016.01) | |
| *C08G 75/0209* | (2016.01) | |
| *C08G 75/0263* | (2016.01) | |
| *C08G 75/0259* | (2016.01) | |
| *C08G 75/0254* | (2016.01) | |
| C08G 75/02 | (2016.01) | |
| C08G 75/16 | (2006.01) | |

(52) U.S. Cl.
CPC ..... *C08G 75/0209* (2013.01); *C08G 75/0254* (2013.01); *C08G 75/0259* (2013.01); *C08G 75/0263* (2013.01)

(58) Field of Classification Search
CPC ....................................... C08G 75/04
USPC ....................................... 528/377
See application file for complete search history.

(56) References Cited

U.S. PATENT DOCUMENTS

| | | |
|---|---|---|
| 6,143,193 A | 11/2000 | Akioka et al. |
| 2003/0045638 A1 | 3/2003 | Qiao et al. |
| 2006/0074219 A1 | 4/2006 | Kawama et al. |
| 2007/0265425 A1 | 11/2007 | Suzuki et al. |
| 2008/0004375 A1 | 1/2008 | Kondo et al. |
| 2009/0156780 A1 | 6/2009 | Kawama et al. |
| 2012/0065361 A1 | 3/2012 | Konno et al. |
| 2012/0178898 A1 | 7/2012 | Unohara et al. |
| 2013/0065054 A1 | 3/2013 | Ichinose et al. |
| 2017/0137573 A1 | 5/2017 | Suzuki et al. |
| 2018/0171078 A1 | 6/2018 | Kimura et al. |

FOREIGN PATENT DOCUMENTS

| | | |
|---|---|---|
| CN | 1122995 A | 5/1996 |
| CN | 1162827 A | 10/1997 |
| CN | 1330095 A | 1/2002 |
| CN | 101084274 A | 12/2007 |
| CN | 102428122 A | 4/2012 |
| CN | 102906160 A | 1/2013 |
| JP | 2004244619 A | 9/2004 |
| JP | 2010106179 A | 5/2010 |
| JP | 2011132517 A | 7/2011 |
| JP | 2011149008 A | 8/2011 |
| JP | 2014047218 A | 3/2014 |

(Continued)

OTHER PUBLICATIONS

Translation of International Search Report for PCT/JP2017/012012 dated Jun. 20, 2017.
Office Action issued in the KR Patent Application No. KR10-2018-7019564, dated Jul. 19, 2019.
Notification of Reasons for Refusal issued in the JP Patent Application No. JP2016-072117, dated Jan. 14, 2020, 9 pgs.

(Continued)

*Primary Examiner* — Duc Truong
(74) *Attorney, Agent, or Firm* — Abel Schillinger, LLP

(57) ABSTRACT

The present invention provides a method for producing granular polyarylene sulfide (PAS) with increased average particle size and enhanced particle strength, a method for increasing the average particle size of granular PAS, a method for enhancing the particle strength of granular PAS, and granular PAS. The method for producing PAS according to the present invention includes: step 1: a preparation step of preparing a mixture containing an organic amide solvent, a sulfur source, water, a dihalo aromatic compound, and an alkali metal hydroxide; step 2: a pre-stage polymerization step of initiating a polymerization reaction by heating the mixture to produce a prepolymer having a dihalo aromatic compound conversion ratio of not less than 50% in the presence of less than an equimolar amount of an alkali metal hydroxide per 1 mol of the sulfur source; step 3: a post-stage polymerization step of continuing the polymerization reaction in the presence of not less than an equimolar amount of an alkali metal hydroxide per 1 mol of the sulfur source to obtain a reaction product mixture; and step 4: a cooling step of cooling the reaction product mixture after the post-stage polymerization step; wherein step 4 is performed in the presence of at least one type of auxiliary agent such as a carboxylate.

7 Claims, No Drawings

(56) References Cited

FOREIGN PATENT DOCUMENTS

| WO | 2006046748 A1 | 5/2006 |
|---|---|---|
| WO | 2011024879 A1 | 3/2011 |
| WO | 2015152032 A1 | 10/2015 |
| WO | 2016199894 A1 | 12/2016 |
| WO | 2017057732 A1 | 4/2017 |
| WO | 2017057733 A1 | 4/2017 |
| WO | 2017057734 A1 | 4/2017 |

OTHER PUBLICATIONS

Office Action issued in the CN Patent Application No. 201780005752.9, dated May 8, 2020, 19 pgs.

METHOD FOR PRODUCING GRANULAR POLYARYLENE SULFIDE, METHOD FOR INCREASING AVERAGE PARTICLE SIZE OF GRANULAR POLYARYLENE SULFIDE, METHOD FOR ENHANCING PARTICLE STRENGTH OF GRANULAR POLYARYLENE SULFIDE, AND GRANULAR POLYARYLENE SULFIDE

TECHNICAL FIELD

The present invention relates to a method for producing granular polyarylene sulfide, a method for increasing the average particle size of granular polyarylene sulfide, a method for enhancing the particle strength of granular polyarylene sulfide, and granular polyarylene sulfide.

BACKGROUND ART

Polyarylene sulfide (hereinafter, also referred to as "PAS"), represented by polyphenylene sulfide (hereinafter, also referred to as "PPS"), is an engineering plastic having excellent heat resistance, chemical resistance, flame retardancy, mechanical strength, electrical characteristics, dimensional stability, and the like. PAS has been widely used in a wide variety of fields, such as electric/electronic devices and devices for automobiles, because PAS can be formed into various molded products, films, sheets, fibers, and the like by ordinary melt processing methods, such as extrusion molding, injection molding, and compression molding.

Examples of the method of producing PAS include methods described in Patent Literatures 1 and 2.

CITATION LIST

Patent Literature

Patent Literature 1: JP 2014-047218 A
Patent Literature 2: WO 2006/046748

SUMMARY OF INVENTION

Technical Problem

In the related art, granular PAS after polymerization was subject to refinement or crushing at the time of transportation/washing, and there has been room for improvement in the product yield of the granular PAS that can be ultimately recovered with the desired shape and size. Therefore, there has been a demand to enhance the particle strength of granular PAS by increasing the average particle size of granular PAS and to enhance product yield by reducing the refinement and crushing of particles in a post-treatment step.

The present invention was conceived to solve the problems described above, and a main object thereof is to provide a method for producing granular PAS with increased average particle size and enhanced particle strength, a method for increasing the average particle size of granular PAS, a method for enhancing the particle strength of granular PAS, and granular PAS.

Solution to Problem

As a result of diligent research to achieve the object described above, the inventors of the present invention have found that the problems described above can be solved by, in a method for producing PAS, adjusting the content of the alkali metal hydroxide contained in the polymerization reaction system during the process and by performing a cooling step in the presence of an auxiliary agent such as a carboxylate. The present invention has been accomplished on the basis of these findings. That is, the present invention can be described as follows.

The method for producing PAS according to the present invention is a method for producing granular polyarylene sulfide by polymerizing a sulfur source and a dihalo aromatic compound in an organic amide solvent, the method comprising:

step 1: a preparation step of preparing a mixture containing an organic amide solvent, a sulfur source, water, a dihalo aromatic compound, and an alkali metal hydroxide;

step 2: a pre-stage polymerization step of initiating a polymerization reaction by heating the mixture to produce a prepolymer having a dihalo aromatic compound conversion ratio of not less than 50% in the presence of less than an equimolar amount of an alkali metal hydroxide per 1 mol of the sulfur source;

step 3: a post-stage polymerization step of continuing the polymerization reaction in the presence of not less than an equimolar amount of an alkali metal hydroxide per 1 mol of the sulfur source to obtain a reaction product mixture; and step 4: a cooling step of cooling the reaction product mixture after the post-stage polymerization step;

wherein step 4 is performed in the presence of at least one type of auxiliary agent selected from the group consisting of carboxylates, alkali metal chlorides, organic sulfonates, alkali metal sulfates, alkali earth metal oxides, alkali metal phosphates, and alkali earth metal phosphates.

In the method for producing PAS according to the present invention, an amount of the auxiliary agent is preferably from 0.1 to 5 mol % per 1 mol of the sulfur source.

In the method for producing PAS according to the present invention, the auxiliary agent is preferably added to the reaction product mixture in step 1 or 2.

In the method for producing PAS according to the present invention, the auxiliary agent is preferably added to the reaction product mixture in step 3.

In the method for producing PAS according to the present invention, the auxiliary agent is preferably added to the reaction product mixture in step 4.

In the method for producing PAS according to the present invention, the auxiliary agent is preferably added to the reaction product mixture in an initial stage of step 3, and the polymerization reaction in step 3 is preferably performed in a range from 245 to 290° C.

In the method for producing PAS according to the present invention, the auxiliary agent is preferably a carboxylate.

In the method of producing PAS according to the present invention, step 3 is preferably performed in the presence of from 4.1 to 14 mol of water per 1 kg of the organic amide solvent.

The method for increasing the average particle size of granular polyarylene sulfide according to the present invention includes:

step 1: a preparation step of preparing a mixture containing an organic amide solvent, a sulfur source, water, a dihalo aromatic compound, and an alkali metal hydroxide;

step 2: a pre-stage polymerization step of initiating a polymerization reaction by heating the mixture to produce a prepolymer having a dihalo aromatic compound conversion ratio of not less than 50% in the presence of less than an equimolar amount of an alkali metal hydroxide per 1 mol of the sulfur source;

step 3: a post-stage polymerization step of continuing the polymerization reaction in the presence of not less than an equimolar amount of an alkali metal hydroxide per 1 mol of the sulfur source to obtain a reaction product mixture; and
step 4: a cooling step of cooling the reaction product mixture after the post-stage polymerization step;
wherein step 4 is performed in the presence of at least one type of auxiliary agent selected from the group consisting of carboxylates, alkali metal chlorides, organic sulfonates, alkali metal sulfates, alkali earth metal oxides, alkali metal phosphates, and alkali earth metal phosphates.

The method for enhancing the particle strength of granular polyarylene sulfide according to the present invention includes:
step 1: a preparation step of preparing a mixture containing an organic amide solvent, a sulfur source, water, a dihalo aromatic compound, and an alkali metal hydroxide;
step 2: a pre-stage polymerization step of initiating a polymerization reaction by heating the mixture to produce a prepolymer having a dihalo aromatic compound conversion ratio of not less than 50% in the presence of less than an equimolar amount of an alkali metal hydroxide per 1 mol of the sulfur source;
step 3: a post-stage polymerization step of continuing the polymerization reaction in the presence of not less than an equimolar amount of an alkali metal hydroxide per 1 mol of the sulfur source to obtain a reaction product mixture; and
step 4: a cooling step of cooling the reaction product mixture after the post-stage polymerization step;
wherein step 4 is performed in the presence of at least one type of auxiliary agent selected from the group consisting of carboxylates, alkali metal chlorides, organic sulfonates, alkali metal sulfates, alkali earth metal oxides, alkali metal phosphates, and alkali earth metal phosphates.

In the method described above, the average particle size of the granular polyarylene sulfide is preferably not less than 300 μm.

In the method described above, the particle strength of the granular polyarylene sulfide is preferably not less than 92%.

In the method described above, a melt viscosity of the granular polyarylene sulfide measured at a temperature of 310° C. and a shear rate of 1216 sec$^{-1}$ is preferably not greater than 50 Pa·s.

The granular polyarylene sulfide according to the present invention has a melt viscosity of not greater than 50 Pas when measured at a temperature of 310° C. and a shear rate of 1216 sec$^{-1}$, and a particle strength of not less than 92%.

Advantageous Effects of Invention

With the present invention, it is possible to provide a method for producing granular PAS with increased average particle size and enhanced particle strength, a method for increasing the average particle size of granular PAS, a method for enhancing the particle strength of granular PAS, and granular PAS.

DESCRIPTION OF EMBODIMENTS

I. Method for Producing Granular PAS

An embodiment of the method for producing granular PAS according to the present invention is described hereinafter. The method for producing granular PAS in this embodiment includes, as main steps, a preparation step, a pre-stage polymerization step, a post-stage polymerization step, and a cooling step. Furthermore, as desired, the production method may have a dehydration step and a post-treatment step.

Of these steps, the cooling step is performed in the presence of at least one type of auxiliary agent selected from the group consisting of carboxylates, alkali metal chlorides, organic sulfonates, alkali metal sulfates, alkali earth metal oxides, alkali metal phosphates, and alkali earth metal phosphates. Each of the steps is described in detail below.

Dehydration Step

The dehydration step is a step of discharging a distillate containing water from the reaction system during the polymerization reaction to the outside the reaction system before the preparation step. The reaction system contains a mixture containing an organic amide solvent, a sulfur source, and an alkali metal hydroxide.

The polymerization reaction of the sulfur source and the dihalo aromatic compound is affected, e.g. promoted or inhibited, by the amount of water present in the polymerization reaction system. Therefore, as long as the water content is a water content that does not inhibit the polymerization reaction, the dehydration step is not necessary; however, the water content of the polymerization reaction system is preferably reduced by performing the dehydration treatment before polymerization.

In the dehydration step, the dehydration is preferably performed by heating in an inert gas atmosphere. The dehydration step is performed in a reaction vessel, and the distillate containing water is discharged outside the reaction vessel. Water to be dehydrated in the dehydration step includes hydrated water contained in the raw materials charged in the dehydration step, an aqueous medium of the aqueous mixture, water produced by a side reaction between the raw materials, and the like.

The heating temperature in the dehydration step is not limited as long as the heating temperature is 300° C. or lower but is preferably from 100 to 250° C. The heating time is preferably from 15 minutes to 24 hours, and more preferably from 30 minutes to 10 hours.

In the dehydration step, the dehydration is performed until the water content reaches a predetermined range. That is, in the dehydration step, the dehydration is preferably performed until the water content becomes preferably 0 to 2 mol, and more preferably from 0.5 to 1.8 mol, per 1 mol of the effective sulfur source. When the water content is too small in the dehydration step, the water content needs to be adjusted to a desired content by adding water in the preparation step performed before the polymerization step.

Preparation Step

The preparation step is a step of preparing a mixture containing an organic amide solvent, a sulfur source, water, a dihalo aromatic compound, and an alkali metal hydroxide. The mixture prepared in the preparation step is also referred to as "preparation mixture".

In the case where the dehydration step is performed, the amount of the sulfur source in the preparation mixture (hereinafter, also referred to as the amount of "charged sulfur source" (effective sulfur source)) can be calculated by subtracting the molar quantity of the hydrogen sulfide volatilized in the dehydration step from the molar quantity of the sulfur source charged in the dehydration step.

The added amount of the alkali metal hydroxide in the preparation step is set so that less than an equimolar amount of the alkali metal hydroxide is present per 1 mol of the sulfur source in the pre-stage polymerization step. This will be described specifically in the "Pre-stage polymerization step" section.

In the case where the dehydration step is performed, as necessary, in the preparation step, an alkali metal hydroxide and water can be added to the mixture remaining in the system after the dehydration step. In particular, the alkali metal hydroxide is added while taking into account the amount of the hydrogen sulfide generated during the dehydration and the amount of the alkali metal hydroxide generated during the dehydration.

In the preparation step, a preparation mixture containing preferably from 0.95 to 1.2 mol, and more preferably from 1 to 1.09 mol, of the dihalo aromatic compound per 1 mol of the sulfur source is prepared.

Note that, as the organic amide solvent, the sulfur source, the dihalo aromatic compound, and the alkali metal hydroxide, those typically used in production of PAS can be used. Examples of the organic amide solvent include amide compounds, such as N,N-dimethylformamide and N,N-dimethylacetamide; N-alkylcaprolactam compounds, such as N-methyl-ε-caprolactam; N-alkylpyrrolidone compounds or N-cycloalkylpyrrolidone compounds, such as N-methyl-2-pyrrolidone (NMP) and N-cyclohexyl-2-pyrrolidone; N,N-dialkylimidazolidinone compounds, such as 1,3-dialkyl-2-imidazolidinone; tetraalkyl urea compounds, such as tetramethyl urea; and hexaalkylphosphate triamide compounds, such as hexamethyl phosphate triamide.

Examples of the sulfur source include alkali metal sulfide, alkali metal hydrosulfide, and hydrogen sulfide.

Examples of alkali metal hydrosulfides include lithium hydrosulfide, sodium hydrosulfide, potassium hydrosulfide, rubidium hydrosulfide, and cesium hydrosulfide.

Examples of the dihalo aromatic compounds include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone. A halogen atom is each atom of fluorine, chlorine, bromine, and iodine, and the two halogen atoms in the dihalo aromatic compound may be the same or different.

Examples of the alkali metal hydroxide that can be used include lithium hydroxide, sodium hydroxide, potassium hydroxide, rubidium hydroxide, and cesium hydroxide.

These materials may be used alone or may be used by mixing two or more types as long as the combination can produce the PAS.

Polymerization Step

The polymerization step is a step of polymerizing PAS by subjecting the sulfur source and the dihalo aromatic compound to a polymerization reaction. The polymerization step includes two steps which are a pre-stage polymerization step and a post-stage polymerization step. Each of the steps is described below.

Pre-Stage Polymerization Step

The pre-stage polymerization step is a step of initiating a polymerization reaction by heating the mixture to produce a prepolymer having a dihalo aromatic compound conversion ratio of not less than 50% in the presence of less than an equimolar amount of an alkali metal hydroxide per 1 mol of the sulfur source. When the number of moles of the alkali metal hydroxide is set to less than an equimolar amount per 1 mol of the sulfur source, the production of byproducts during the polymerization reaction is easily suppressed, the nitrogen content derived from impurities in the produced PAS is easily made sufficiently small, and the yield of the PAS is easily enhanced sufficiently.

The number of moles of the alkali metal hydroxide per 1 mol of the sulfur source (charged sulfur source) is preferably in a range from 0.5 to 0.99 mol, more preferably from 0.7 to 0.98 mol, furthermore preferably from 0.75 to 0.97 mol, and particularly preferably 0.8 mol or greater and less than 0.95 mol. The number of moles of the alkali metal hydroxide is calculated based on the number of moles of the alkali metal hydroxide added in the preparation step. In the case where the dehydration step is performed, the number of moles of the alkali metal hydroxide is calculated based on the number of moles of the alkali metal hydroxide added in the dehydration step and the number of moles of the alkali metal hydroxide generated due to generation of hydrogen sulfide in the dehydration step. When the sulfur source contains an alkali metal sulfide, the number of moles of the alkali metal hydroxide per 1 mol of the sulfur source (charged sulfur source) is calculated in a manner that the number of moles of the alkali metal sulfide is included. When the sulfur source contains hydrogen sulfide, the number of moles of the alkali metal hydroxide per 1 mol of the sulfur source (charged sulfur source) is calculated in a manner that the number of moles of the generated alkali metal sulfide is included. However, the number of moles of the alkali metal hydroxide added for other purposes, such as the number of moles of the alkali metal hydroxide consumed in a neutralization reaction or the like in the case where the organic carboxylic acid metal salt is used in a form of a combination of an organic carboxylic acid and an alkali metal hydroxide as a polymerization aid and/or a phase separation agent, is not included in the number of moles of the alkali metal hydroxide per 1 mol of the sulfur source (charged sulfur source). Furthermore, in the case where at least one type of acid selected from the group consisting of inorganic acids and organic acids is used in the preparation step or the pre-stage polymerization step so that the auxiliary agent is present in the cooling step, as described above, the number of moles of the alkali metal hydroxide required to neutralize the at least one type of acid is not included in the number of moles of the alkali metal hydroxide per 1 mol of the sulfur source (charged sulfur source).

To shorten the polymerization cycle time, the polymerization reaction method may be a method that uses two or more reaction vessels. In the pre-stage polymerization step and the post-stage polymerization step, the reaction system may be in a uniformly dissolved state or may be a phase-separated state. In many cases, in the pre-stage polymerization step, the polymerization reaction is performed in the reaction system in which the produced polymer is uniformly dissolved in the organic amide solvent.

In the pre-stage polymerization step, preferably, a polymerization reaction is initiated by heating the mixture prepared in the preparation step, i.e. the preparation mixture, to a temperature of 170 to 270° C. and a prepolymer having a dihalo aromatic compound conversion ratio of 50% or greater is produced. The polymerization temperature in the pre-stage polymerization step is preferably selected from the range of 180 to 265° C. from the perspective of suppressing side reactions and decomposition reactions.

The dihalo aromatic compound conversion ratio is preferably from 50 to 98%, more preferably from 60 to 97%, furthermore preferably from 65 to 96%, and particularly preferably from 70 to 95%. The conversion ratio of the dihalo aromatic compound can be calculated by determining the amount of the dihalo aromatic compound remaining in the reaction mixture by gas chromatography and then performing a calculation based on the remaining amount of the dihalo aromatic compound, the charged amount of the dihalo aromatic compound, and the charged amount of the sulfur source.

The amount of at least one type of water, the alkali metal hydroxide, and the organic amide solvent may be varied in the middle of the polymerization reaction. For example, water and the alkali metal hydroxide may be added to the reaction system in the middle of the polymerization. However, in the pre-stage polymerization step, typically, the preparation mixture prepared in the preparation step is preferably used to initiate the polymerization reaction and terminate the pre-stage polymerization reaction.

Post-Stage Polymerization Step

The post-stage polymerization step is a step of continuing the polymerization reaction in the presence of not less than an equimolar amount of an alkali metal hydroxide per 1 mol of the sulfur source to obtain a reaction product mixture. In this specification, a reaction product mixture refers to a mixture containing a reaction product produced in the polymerization reaction described above, and production begins simultaneously with the initiation of the polymerization reaction described above.

For the polymerization temperature in the post-stage polymerization step, the polymerization reaction is continued by heating to preferably 245 to 290° C., more preferably 250 to 285° C., and furthermore preferably 255 to 280° C. The polymerization temperature may be maintained at a fixed temperature or may be increased or decreased stepwise as necessary. The temperature is preferably maintained at a fixed temperature from the perspective of controlling the polymerization reaction. The polymerization reaction time is typically in the range from 10 minutes to 72 hours, and preferably from 30 minutes to 48 hours.

In the post-stage polymerization step, the alkali metal hydroxide is added so that not less than an equimolar amount of the alkali metal hydroxide is present per 1 mol of the sulfur source. The amount of the alkali metal hydroxide to be added is preferably from 0.01 to 0.6 mol, more preferably from 0.02 to 0.4 mol, even more preferably from 0.03 to 0.35 mol, and particularly preferably from 0.06 to 0.3 mol, per 1 mol of the sulfur source. In the post-stage polymerization step, the alkali metal hydroxide is preferably added in a regulated manner that the total amount of the alkali metal hydroxide becomes preferably from 1.00 to 1.1 mol, more preferably from 1.01 to 1.08 mol, and even more preferably from 1.02 to 1.06 mol, per 1 mol of the sulfur source. When the total amount of the alkali metal hydroxide per 1 mol of the sulfur source is too small, PAS having a desired degree of polymerization may not be obtained. The total amount of the alkali metal hydroxide is the total of the amount of the alkali metal hydroxide present in the preparation mixture, the amount of the alkali metal hydroxide added in the post-stage polymerization step, and the amount of the alkali metal hydroxide optionally added in the pre-stage polymerization step. However, as in the case of the pre-stage polymerization step, the number of moles of the alkali metal hydroxide added for other purposes is not included in the number of moles of the alkali metal hydroxide per 1 mol of the sulfur source (charged sulfur source). In addition, in the case where at least one type of acid selected from the group consisting of inorganic acids and organic acids is used in the post-stage polymerization step so that the auxiliary agent is present in the cooling step, as described above, the number of moles of the alkali metal hydroxide required to neutralize the at least one type of acid is not included in the number of moles of the alkali metal hydroxide per 1 mol of the sulfur source (charged sulfur source).

The time at which the alkali metal hydroxide is added may be at the beginning of the post-stage polymerization step or in the middle of the post-stage polymerization step. Furthermore, the alkali metal hydroxide may be added at once or intermittently or continuously. When the alkali metal hydroxide is not added in the post-stage polymerization step, formation of byproducts may not be suppressed, the amount of impurities may be increased, and it may become difficult to stably obtain PAS having a high melt viscosity.

In the post-stage polymerization step, the phase-separated polymerization may be performed. In the phase-separated polymerization, the polymerization reaction is continued in a condition where a concentrated polymer phase and a dilute polymer phase are phase-separated in a reaction system in the presence of a phase separation agent. Specifically, by adding a phase separation agent, the polymerization reaction system (polymerization reaction mixture) is phase-separated into the concentrated polymer phase (phase mainly containing dissolved PAS) and the dilute polymer phase (phase mainly containing organic amide solvent). The phase separation agent may be added at the beginning of the post-stage polymerization step, or the phase separation agent may be added in the middle of the post-stage polymerization step such that the phase separation occurs in the middle of the post-stage polymerization step. Note that, although the phase separation agent may be present not only in the post-stage polymerization step, the phase separation agent is preferably used in the post-stage polymerization step.

Examples of the phase separation agent that can be used include at least one type selected from the group consisting of organic carboxylic acid metal salts, organic sulfonic acid metal salts, alkali metal halides, alkaline earth metal halides, alkaline earth metal salts of aromatic carboxylic acids, phosphoric acid alkali metal salts, alcohols, paraffin hydrocarbons, and water. Among these, water is preferable because of low cost and ease in post-treatment. Furthermore, a combination of the organic carboxylic acid salt and water is also preferable. The salts may be in forms obtained by separately adding corresponding acids and bases.

The amount of the phase separation agent to be used varies depending on the type of compound to be used, and the amount is typically in a range from 1 to 10 mol per 1 kg of the organic amide solvent. In particular, in the post-stage polymerization step, a method, in which water as the phase separation agent is added in a manner that the water content in the reaction system is greater than 4 mol but 20 mol or less per 1 kg of the organic amide solvent, is preferably employed. When water is added as the phase separation agent in the post-stage polymerization step, the water is preferably added in a manner that the water content in the reaction system is more preferably from 4.1 to 14 mol, and particularly preferably from 4.2 to 10 mol, per 1 kg of the organic amide solvent.

Note that the auxiliary agent may be added to the reaction product mixture in an initial stage of the post-stage polymerization step, and the polymerization reaction in the post-stage polymerization step may be performed in a range of from 245 to 290° C. At this time, the polymerization reaction may be performed while using the auxiliary agent in combination with a phase separation agent, or the polymerization reaction may be performed with the auxiliary agent alone. When the auxiliary agent functions as a phase separation agent, the phase-separated polymerization in a phase-separated state can be achieved, even in a case where the polymerization reaction described above is performed with the auxiliary agent alone. Note that the initial stage of the post-stage polymerization step refers to the first stage when the post-stage polymerization step is divided equally into two or more stages, or immediately after the start of the post-stage polymerization step, and the initial stage is preferably immediately after the start of the post-stage polymerization step.

Cooling Step

The cooling step is a step of cooling the reaction product mixture after the post-stage polymerization step.

In the cooling step, a liquid phase containing a product polymer is cooled. In the cooling step, it is preferable to gradually cool the liquid phase rather than rapidly cooling the liquid phase by means of flushing a solvent or the like in that a granular polymer is more easily obtained. Gradual cooling is preferably performed by cooling the liquid phase while regulating the temperature drop rate to from 2.0 to 0.1° C./min. Gradual cooling can be performed with a method of exposing the polymerization reaction system to the ambient environment temperature (for example, room temperature). To control the cooling rate of the liquid phase, a method of feeding a coolant into the jacket of the polymerization reaction tank or circulating the liquid phase with a reflux condenser may be used. The granulation of the polymer can be accelerated by such control of the cooling rate.

The cooling step is performed in the presence of at least one type of auxiliary agent selected from the group consisting of carboxylates, alkali metal chlorides, organic sulfonates, alkali metal sulfates, alkali earth metal oxides, alkali metal phosphates, and alkali earth metal phosphates. As a result, in the method for producing granular PAS according to the present invention, granular PAS having an increased average particle size and enhanced particle strength can be produced. The auxiliary agent is preferably a carboxylate from the perspective of availability, handleability, or the like.

As long as an auxiliary agent is present in the cooling step, the stage at which the auxiliary agent is added is not particularly limited, and examples thereof include the preparation step, the pre-stage polymerization step, the post-stage polymerization step, or the cooling step.

The auxiliary agent may be added to the reaction system in the form of the aforementioned compound such as a carboxylate itself, or may be made present in the cooling step by adding the auxiliary agent to the reaction system in the form of a corresponding organic acid or inorganic acid to produce a compound corresponding to the auxiliary agent by means of a neutralization reaction with the alkali metal hydroxide in the reaction system.

The amount of the auxiliary agent is preferably from 0.1 to 5 mol %, more preferably from 0.5 to less than 5 mol %, and even more preferably from 1 to 4.8 mol % per 1 mol of the sulfur source. When the amount of the auxiliary agent is within the range described above, the average particle size is more easily increased, and the particle strength is more easily enhanced.

Post-Treatment Step

The post-treatment step is a step of obtaining PAS by removing unnecessary components from the slurry obtained in the polymerization step. The post-treatment step in the method of producing PAS of an embodiment of the present invention is not limited as long as the step is a step typically used in production of PAS.

After the completion of the polymerization reaction, a slurry containing the polymer (hereinafter, also referred to as "product slurry") may be obtained by cooling the reaction mixture, for example. The cooled product slurry is separated by filtration as is or after diluted with water or the like, then washed and filtered repeatedly, and dried, whereby PAS can be recovered.

After various solid-liquid separation, the PAS may be washed with the organic amide solvent, which is the same as the polymerization solvent, or an organic solvent, such as ketones (e.g., acetone) and alcohols (e.g., methanol). Furthermore, the PAS may be washed with high temperature water or the like. The produced PAS may be treated with acids or salts, such as ammonium chloride.

II. Method for Increasing Average Particle Size of Granular PAS

The present invention provides a method for increasing the average particle size of granular PAS, the method including:
step 1: a preparation step of preparing a mixture containing an organic amide solvent, a sulfur source, water, a dihalo aromatic compound, and an alkali metal hydroxide;
step 2: a pre-stage polymerization step of initiating a polymerization reaction by heating the mixture to produce a prepolymer having a dihalo aromatic compound conversion ratio of not less than 50% in the presence of less than an equimolar amount of an alkali metal hydroxide per 1 mol of the sulfur source;
step 3: a post-stage polymerization step of continuing the polymerization reaction in the presence of not less than an equimolar amount of an alkali metal hydroxide per 1 mol of the sulfur source to obtain a reaction product mixture; and
step 4: a cooling step of cooling the reaction product mixture after the post-stage polymerization step;
wherein step 4 is performed in the presence of at least one type of auxiliary agent selected from the group consisting of carboxylates, alkali metal chlorides, organic sulfonates, alkali metal sulfates, alkali earth metal oxides, alkali metal phosphates, and alkali earth metal phosphates. In the method for increasing the average particle size described above, the details of the preparation step, the pre-stage polymerization step, the post-stage polymerization step, the cooling step, and the like are as described above.

In the method for increasing the average particle size described above, the average particle size of granular PAS can be increased by adjusting the content of the alkali metal hydroxide contained in the polymerization reaction system during the process and by performing a cooling step in the presence of an auxiliary agent such as a carboxylate.

III. Method for Enhancing Particle Strength of Granular PAS

The present invention provides a method for enhancing the particle strength of granular PAS, the method including:
step 1: a preparation step of preparing a mixture containing an organic amide solvent, a sulfur source, water, a dihalo aromatic compound, and an alkali metal hydroxide;
step 2: a pre-stage polymerization step of initiating a polymerization reaction by heating the mixture to produce a prepolymer having a dihalo aromatic compound conversion ratio of not less than 50% in the presence of less than an equimolar amount of an alkali metal hydroxide per 1 mol of the sulfur source;

step 3: a post-stage polymerization step of continuing the polymerization reaction in the presence of not less than an equimolar amount of an alkali metal hydroxide per 1 mol of the sulfur source to obtain a reaction product mixture; and step 4: a cooling step of cooling the reaction product mixture after the post-stage polymerization step;

wherein step 4 is performed in the presence of at least one type of auxiliary agent selected from the group consisting of carboxylates, alkali metal chlorides, organic sulfonates, alkali metal sulfates, alkali earth metal oxides, alkali metal phosphates, and alkali earth metal phosphates. In the method for enhancing the particle strength described above, the details of the preparation step, the pre-stage polymerization step, the post-stage polymerization step, the cooling step, and the like are as described above.

In the method for enhancing the particle strength described above, the particle strength of granular PAS can be increased by adjusting the content of the alkali metal hydroxide contained in the polymerization reaction system during the process and by performing a cooling step in the presence of an auxiliary agent such as a carboxylate.

IV. Granular PAS

In the production method according to the present invention, the method for increasing the average particle size according to the present invention, and the method for enhancing the particle strength according to the present invention (also collectively called "the method according to the present invention" hereafter), the average particle size of the granular PAS is preferably not less than 300 μm, more preferably from 320 to 2000 μm, and even more preferably from 350 to 1500 μm. In the method according to the present invention, the particle strength of the granular PAS is preferably not less than 92%, more preferably not less than 93%, and even more preferably not less than 94%. In the method according to the present invention, the melt viscosity of the granular PAS measured at a temperature of 310° C. and a shear rate of 1216 sec$^{-1}$ is preferably not greater than 50, more preferably from 3 to 45 Pa·s, and even more preferably from 5 to 40 Pa·s. Note that the melt viscosity of granular PAS can be measured by using approximately 20 g of dried polymer and using a capillograph at a predetermined temperature and shear rate condition.

The granular PAS according to the present invention has a melt viscosity of not greater than 50 Pa·s, preferably from 3 to 45 Pa·s, and more preferably from 5 to 40 Pa·s when measured at a temperature of 310° C. and a shear rate of 1216 sec$^{-1}$, and a particle strength of not less than 92%, preferably not less than 93%, and more preferably not less than 94%. Further, the granular PAS described above has an average particle size of not less than 300 μm, more preferably from 320 to 2000 μm, and even more preferably from 350 to 1500 μm. Such a granular PAS can be produced, for example, with the production method according to the present invention described above. In this way, the granular PAS according to the present invention has high particle strength and preferably further has a large average particle size in spite of having a low melt viscosity.

In this specification, the particle strength refers to mass ratio calculated from B/A×100 when 0.1 mass % of carbon black is added to 30 g of the granular PAS (A), the mixture is sieved using a sieve with a sieve opening of 150 μm, the granular PAS from which a fine powder was removed is transferred to a 1 L PP bottle, 500 g of glass beads are added, crushing is performed for 30 minutes at 300 rpm with a shaker, the granular PAS is sieved using a sieve with a sieve opening of 2830 μm after crushing, the crushed fine powder is removed using a sieve with a sieve opening of 150 μm, and the granular PAS on the upper part of the sieve is weighed (this mass is defined as B).

The PAS of the present invention can be formed into various injection molded products or extrusion molded products, such as sheets, films, fibers, and pipes, as is or after undergoing oxidative-crosslinking, alone or by blending with various inorganic fillers, fibrous fillers, and various synthetic resins, as desired.

In the present invention, the PAS is not limited and is preferably polyphenylene sulfide (PPS).

The present invention is not limited to the embodiments described above, and various modifications are possible within the scope indicated in the claims. Embodiments obtained by appropriately combining the technical means disclosed by the embodiments are also included in the technical scope of the present invention. In addition, all of the documents disclosed in the present specification are hereby incorporated by reference.

EXAMPLES

Embodiments of the present invention will be described in further detail hereinafter with reference to examples. The present invention is not limited to the examples below, and it goes without saying that various aspects are possible with respect to the details thereof.

(1) Average Particle Size

The average particle size of the granular PAS was measured with a sieving method using sieves with a sieve opening of 2800 μm (7-mesh (number of stitches/inch)), a sieve opening of 1410 μm (12-mesh (number of stitches/inch)), a sieve opening of 1000 μm (16-mesh (number of stitches/inch)), a sieve opening of 710 μm (24-mesh (number of stitches/inch)), a sieve opening of 500 μm (32-mesh (number of stitches/inch)), a sieve opening of 250 μm (60-mesh (number of stitches/inch)), a sieve opening of 150 μm (100-mesh (number of stitches/inch)), a sieve opening of 105 μm (145-mesh (number of stitches/inch)), a sieve opening of 75 μm (200-mesh (number of stitches/inch)), and a sieve opening of 38 μm (400-mesh (number of stitches/inch)), and the average particle size yielding a cumulative mass of 50 mass % was calculated from the mass of the sifted upper material of each sieve. The results are shown in Table 1.

(2) Particle Strength

First, 0.1 mass % of carbon black was added to 30 g of granular PAS (A), and the mixture was sieved using a sieve with a sieve opening of 150 μm (initial fine powder removal). The sample from which a fine powder was removed was then transferred to a 1 L PP bottle, and after 500 g of glass beads were added, crushing was performed for 30 minutes at 300 rpm with a shaker (AS-1N Universal Shaker). After crushing, the sample was sieved using a sieve with a sieve opening of 2830 μm to remove the glass beads, and after the crushed fine powder was removed using a sieve with a sieve opening of 150 μm, the granular PAS on the upper part of the sieve (B) was weighed. The particle strength was calculated from B/A×100.

(3) Melt Viscosity

The melt viscosity of the granular PAS was measured using a "Capillograph 1-C" (trade name) available from Toyo Seiki Seisaku-sho, Ltd. equipped with a nozzle 1.0 mm in diameter and 10.0 mm long as a capillary. The preset temperature was set to 310° C. A polymer sample was introduced into the device, and after the sample was held there for 5 minutes, the melt viscosity was measured at a shear rate of 1200 sec$^{-1}$.

Example 1

Dehydration Step

Into a 20-liter autoclave, 6010 g of NMP, 2000 g of sodium hydrosulfide aqueous solution (NaSH: purity 62.50 mass %), and 1019 g of sodium hydroxide (NaOH: purity 73.3 mass %) were introduced. After the inside of the autoclave was purged with nitrogen gas, it was stirred by a stirrer for approximately 4 hours at a rotation speed of 250 rpm while being heated gradually to 200° C., after which 856 g of water ($H_2O$), 692 g of NMP, and 13 g of hydrogen sulfide ($H_2S$) were distilled away.

Polymerization Step

After the dehydration step, the contents of the autoclave were cooled to 150° C., and 3318 g of pDCB, 2900 g of NMP, 7 g of sodium hydroxide, and 59 g of water were added and reacted for 5 hours at a temperature of 220° C. while stirring to perform pre-stage polymerization. The ratio (g/mol) of NMP to the charged sulfur source (abbreviated as the "charged S" hereafter) in the drum was 375. The ratio of pDCB to the charged S (mol/mol) was 1.030. The ratio of $H_2O$ to the charged S (mol/mol) was 1.50. The ratio of NaOH to the charged S (mol/mol) was 0.900. The pDCB conversion ratio during the pre-stage polymerization step was 92%.

After the pre-stage polymerization step was completed, the rotation speed of the stirrer was raised to 400 rpm, and 18 g of sodium acetate, 122 g of sodium hydroxide, and 446 g of ion-exchanged water were injected while the contents of the autoclave were stirred. This operation corresponds to adding sodium acetate to the reaction product mixture in step 3. The ratio of $H_2O$ to charged S (mol/mol) was 2.63. The ratio of sodium acetate to charge S (mol/mol) was 0.01. The ratio of NaOH to charged S (mol/mol) was 1.035. The Ratio of $H_2O$ to NMP (mol/kg) was 7.0. After the injection of ion-exchanged water, the temperature was raised to 255° C., and the post-stage polymerization step was carried out for 4 hours of reaction.

Separation Step

After the post-stage polymerization step, the mixture was cooled to around room temperature, and the contents were sieved using a screen with an aperture size of 150 μm (100 mesh). After the mixture was washed with acetone and ion-exchanged water, the mixture was washed with an acetic acid aqueous solution and dried overnight to obtain granular PPS. The average particle size was 474 μm, and the particle strength was 95%.

Example 2

The same operation as in Example 1 was performed except that the amount of sodium acetate was changed to 54 g (the ratio of sodium acetate to charged S (mol/mol) was 0.03). The average particle size was 963 μm, and the particle strength was 100%.

Example 3

The same operation as in Example 1 was performed except that the amount of sodium acetate was changed to 90 g (the ratio of sodium acetate to charged S (mol/mol) was 0.05). The average particle size was 1300 μm, and the particle strength was 100%.

Comparative Example 1

The same operation as in Example 1 was performed except that sodium acetate was not added. The average particle size was 364 μm, and the particle strength was 91%.

Comparative Example 2

Into a 20-liter autoclave, 6001 g of NMP, 2000 g of sodium hydrosulfide aqueous solution (NaSH: purity 62.50 mass %), and 1210 g of sodium hydroxide (NaOH: purity 73.3 mass %) were introduced. After the inside of the autoclave was purged with nitrogen gas, it was stirred by a stirrer for approximately 4 hours at a rotation speed of 250 rpm while being heated gradually to 200° C. so as to distill away 915 g of water ($H_2O$), 645 g of NMP, and 14 g of hydrogen sulfide ($H_2S$).

Polymerization Step

After the dehydration step the contents of the autoclave were cooled to 150° C., and 3393 g of pDCB, 2849 g of NMP, 9 g of sodium hydroxide, and 67 g of water were added and reacted for 5 hours at a temperature of 220° C. while stirring to perform pre-stage polymerization. The ratio (g/mol) of NMP to the charged S in the drum was 375. The ratio of pDCB to the charged S (mol/mol) was 1.055. The ratio of $H_2O$ to the charged S (mol/mol) was 1.50. The ratio of NaOH to the charged S (mol/mol) was 1.060. The pDCB conversion ratio during the pre-stage polymerization step was 91%.

After the pre-stage polymerization step was completed, the rotation speed of the stirrer was raised to 400 rpm, and 445 g of ion-exchanged water was added to the autoclave while stirring. The ratio of $H_2O$ to charged S (mol/mol) was 2.63. After the injection of ion-exchanged water, the temperature was raised to 255° C., and the post-stage polymerization step was carried out for 4 hours of reaction.

Separation Step

After the post-stage polymerization step, the mixture was cooled to around room temperature, and the contents were sieved using a screen with an aperture size of 150 μm (100 mesh). After the mixture was washed with acetone and ion-exchanged water, the mixture was washed with an acetic acid aqueous solution and dried overnight to obtain granular PPS. The average particle size was 353 μm, and the particle strength was 90%.

Comparative Example 3

The same operation as in Comparative Example 2 was performed except that 18 g of sodium acetate was added together with ion-exchanged water (the ratio of sodium acetate to charged S (mol/mol) was 0.01) after the completion of pre-stage polymerization. The average particle size was 393 μm, and the particle strength was 90%.

Comparative Example 4

The same operation as in Comparative Example 3 was performed except that the amount of sodium acetate was changed to 90 g (the ratio of sodium acetate to charged S (mol/mol) was 0.05). The average particle size was 457 μm, and the particle strength was 99%.

Comparative Example 5

The same operation as in Comparative Example 3 was performed except that the amount of sodium acetate was changed to 179 g (the ratio of sodium acetate to charged S (mol/mol) was 0.10). The average particle size was 1,523 μm, and the particle strength was 100%.

TABLE 1

|  |  | Sodium acetate (mol %/Smol) | Average particle diameter (μm) | Particle strength (%) | Melt viscosity (Pa · s) |
|---|---|---|---|---|---|
| Conventional method (NaOH/charged S ≥ 1) | Comparative Example 2 | 0 | 353 | 90 | 27 |
|  | Comparative Example 3 | 1 | 393 | 90 | 25 |
|  | Comparative example 4 | 5 | 457 | 99 | 31 |
|  | Comparative example 5 | 10 | 1,523 | 100 | 38 |
| Present invention (NaOH/charged S < 1) | Comparative Example 1 | 0 | 364 | 91 | 34 |
|  | Example 1 | 1 | 474 | 95 | 32 |
|  | Example 2 | 3 | 963 | 100 | 37 |
|  | Example 3 | 4.5 | 1,300 | 100 | 34 |

As is clear from Table 1, with the present invention, even when a smaller amount of sodium acetate is added in comparison to a conventional method, granular PAS having an increased average particle size and enhanced particle strength can be produced.

The invention claimed is:

1. A method for producing granular polyarylene sulfide by polymerizing a sulfur source and a dihalo aromatic compound in an organic amide solvent, the method comprising:
   step 1: a preparation step of preparing a mixture containing an organic amide solvent, a sulfur source, water, a dihalo aromatic compound, and an alkali metal hydroxide;
   step 2: a pre-stage polymerization step of initiating a polymerization reaction by heating the mixture to produce a prepolymer having a dihalo aromatic compound conversion ratio of not less than 50% in the presence of less than an equimolar amount of an alkali metal hydroxide per 1 mol of the sulfur source;
   step 3: a post-stage polymerization step of continuing the polymerization reaction in the presence of not less than an equimolar amount of an alkali metal hydroxide per 1 mol of the sulfur source to obtain a reaction product mixture; and
   step 4: a cooling step of cooling the reaction product mixture after the post-stage polymerization step;
   wherein step 4 is performed in the presence of at least one type of auxiliary agent selected from the group consisting of carboxylates, alkali metal chlorides, organic sulfonates, alkali metal sulfates, alkali earth metal oxides, alkali metal phosphates, and alkali earth metal phosphates;
   wherein an amount of the auxiliary agent is from 0.1 to 5 mol % per 1 mol of the sulfur source; and
   wherein step 3 is performed in the presence of from 4.1 to 14 mol of water per 1 kg of the organic amide solvent.

2. The method according to claim 1, wherein the auxiliary agent is a carboxylate.

3. A method for increasing an average particle size of granular polyarylene sulfide, the method comprising:
   step 1: a preparation step of preparing a mixture containing an organic amide solvent, a sulfur source, water, a dihalo aromatic compound, and an alkali metal hydroxide;
   step 2: a pre-stage polymerization step of initiating a polymerization reaction by heating the mixture to produce a prepolymer having a dihalo aromatic compound conversion ratio of not less than 50% in the presence of less than an equimolar amount of an alkali metal hydroxide per 1 mol of the sulfur source;
   step 3: a post-stage polymerization step of continuing the polymerization reaction in the presence of not less than an equimolar amount of an alkali metal hydroxide per 1 mol of the sulfur source to obtain a reaction product mixture; and
   step 4: a cooling step of cooling the reaction product mixture after the post-stage polymerization step;
   wherein step 4 is performed in the presence of at least one type of auxiliary agent selected from the group consisting of carboxylates, alkali metal chlorides, organic sulfonates, alkali metal sulfates, alkali earth metal oxides, alkali metal phosphates, and alkali earth metal phosphates;
   wherein an amount of the auxiliary agent is from 0.1 to 5 mol % per 1 mol of the sulfur source, and
   wherein step 3 is performed in the presence of from 4.1 to 14 mol of water per 1 kg of the organic amide solvent.

4. A method for enhancing a particle strength of granular polyarylene sulfide, the method comprising:
   step 1: a preparation step of preparing a mixture containing an organic amide solvent, a sulfur source, water, a dihalo aromatic compound, and an alkali metal hydroxide;

step 2: a pre-stage polymerization step of initiating a polymerization reaction by heating the mixture to produce a prepolymer having a dihalo aromatic compound conversion ratio of not less than 50% in the presence of less than an equimolar amount of an alkali metal hydroxide per 1 mol of the sulfur source;

step 3: a post-stage polymerization step of continuing the polymerization reaction in the presence of not less than an equimolar amount of an alkali metal hydroxide per 1 mol of the sulfur source to obtain a reaction product mixture; and step 4: a cooling step of cooling the reaction product mixture after the post-stage polymerization step;

wherein step 4 is performed in the presence of at least one type of auxiliary agent selected from the group consisting of carboxylates, alkali metal chlorides, organic sulfonates, alkali metal sulfates, alkali earth metal oxides, alkali metal phosphates, and alkali earth metal phosphates;

an amount of the auxiliary agent is from 0.1 to 5 mol % per 1 mol of the sulfur source, and step 3 is performed in the presence of from 4.1 to 14 mol of water per 1 kg of the organic amide solvent.

5. The method according to claim 1, wherein the average particle size of the granular polyarylene sulfide is not less than 300 μm.

6. The method according to claim 1, wherein the particle strength of the granular polyarylene sulfide is not less than 92%.

7. The method according to claim 1, wherein a melt viscosity of the granular polyarylene sulfide measured at a temperature of 310° C. and a shear rate of 1216 $sec^{-1}$ is not greater than 50 Pa·s.

* * * * *